(12) United States Patent
    Kataoka et al.

(10) Patent No.: US 9,038,970 B2
(45) Date of Patent: May 26, 2015

(54) VIBRATION-PROOF PIPE CLAMP

(71) Applicant: Newfrey LLC, Newark, DE (US)

(72) Inventors: Shin Kataoka, Toyohashi (JP); Suguru Mizukoshi, Toyohashi (JP)

(73) Assignee: NEWFREY LLC, Newark, DE (US)

( * ) Notice: Subject to any disclaimer, the term of this patent is extended or adjusted under 35 U.S.C. 154(b) by 0 days.

(21) Appl. No.: 13/786,526

(22) Filed: Mar. 6, 2013

(65) Prior Publication Data

US 2013/0320182 A1    Dec. 5, 2013

(30) Foreign Application Priority Data

Jun. 4, 2012   (JP) ................................ 2012-127162

(51) Int. Cl.
    *F16L 55/035*    (2006.01)
    *F16L 3/12*      (2006.01)
    *F16L 3/223*     (2006.01)

(52) U.S. Cl.
    CPC .................. *F16L 3/12* (2013.01); *F16L 3/1203* (2013.01); *F16L 3/223* (2013.01); *F16L 55/035* (2013.01)

(58) Field of Classification Search
    CPC ........... F16L 37/02; F16L 3/02; F16L 55/035; F16L 55/0336; F16L 3/223; F16L 3/1203; F16M 13/00
    USPC ......... 248/68.1, 71, 74.1, 562, 580, 581, 582, 248/602, 632, 634, 560, 188.1, 636; 24/297, 336, 335, 338, 339
    See application file for complete search history.

(56) References Cited

U.S. PATENT DOCUMENTS

| 2,520,757 | A | * | 8/1950 | Cain .............................. 248/632 |
| 5,190,251 | A | * | 3/1993 | Bodo .............................. 248/73 |
| 5,257,768 | A | * | 11/1993 | Juenemann et al. .......... 248/604 |
| 5,947,426 | A | * | 9/1999 | Kraus ........................... 248/74.2 |
| 6,290,201 | B1 | * | 9/2001 | Kanie et al. ................... 248/636 |
| 6,915,990 | B2 | * | 7/2005 | Maruyama .................... 248/68.1 |
| 7,316,374 | B2 | * | 1/2008 | Maruyama .................... 248/68.1 |
| 7,658,350 | B2 | * | 2/2010 | Bauer ............................. 248/65 |
| 8,668,174 | B2 | * | 3/2014 | Kato ............................. 248/74.2 |
| 2005/0127248 | A1 | * | 6/2005 | Suzuki et al. ................. 248/68.1 |
| 2006/0249634 | A1 | * | 11/2006 | Van Walraven ................ 248/71 |
| 2009/0166489 | A1 | * | 7/2009 | Volchko ..................... 248/205.1 |
| 2014/0175255 | A1 | * | 6/2014 | Furusawa ...................... 248/562 |

FOREIGN PATENT DOCUMENTS

| JP | 4-75289 U | 6/1992 |
| JP | 9-303621 A | 11/1997 |

(Continued)

*Primary Examiner* — Terrell McKinnon
*Assistant Examiner* — Eret McNichols
(74) *Attorney, Agent, or Firm* — Michael P. Leary (57) ABSTRACT

A vibration-dampening clamp for clamping long, narrow articles such as pipes includes a pipe clamp member made of hard resin that has pipe clamp portions for restraining the long, narrow articles, a mounting member made of hard resin that has a mounting portion for mounting to the fastened member, and an elastic connection member made of soft resin that is packed between the pipe clamp member and the mounting member. The pipe clamp member and the mounting member do not make direct contact, so that detachment of the pipe clamp member from the mounting member is inhibited. The detachment inhibiting structure incorporates a T-shaped portion that comprises a flat plate portion and a prism portion formed in a mounting member, and an arm portion formed in the pipe clamp member that extends about the periphery of the flat plate portion of the T-shaped portion.

9 Claims, 8 Drawing Sheets

(56) References Cited

FOREIGN PATENT DOCUMENTS

| JP | 9-303621 | U | 11/1997 |
| JP | 2001-106849 | A | 4/2001 |
| JP | 2003-120862 | A | 4/2003 |
| JP | 2008-190682 | A | 8/2008 |

\* cited by examiner

VIBRATION-PROOF PIPE CLAMP

CROSS-REFERENCE TO RELATED APPLICATIONS

This application claims priority, under 35 U.S.C. §119(a)-(d), to JP Patent Application No. 2012-127162 filed Jun. 4, 2012, the contents of which are incorporated herein by reference in its entirety.

FIELD OF THE INVENTION

The present invention concerns a pipe clamp for clamping an elongated component such as a pipe or wiring harness to a fastened member such as an automobile chassis. In particular, it concerns a vibration-proof pipe clamp that does not transmit vibration from a component such as a pipe to a fastened member such as a chassis or does not transmit vibration from a fastened member such as a chassis to a component such as a pipe.

BACKGROUND OF THE INVENTION

Patent Documents

Gazette of Japanese Kokai Publication 2001-106849 ("Patent Literature 1")
Gazette of Utility Disclosure No. Hei-4-75289 ("Patent Literature 2")
Gazette of Japanese Kokai Publication Hei-9-303621 ("Patent Literature 3")
Gazette of Japanese Kokai Publication 2003-120862 ("Patent Literature 4")
Gazette of Japanese Kokai Publication 2008-190682 ("Patent Literature 5")

Pipe clamps provided with a clamp portion that clamps an elongated member such as a pipe and a main portion that mount to a fastened member such as an automobile body panel are available to mount pipes to fastened members by clamping a pipe to a clamp portion and then mounting this main portion on a fastened member. The clamp portion has an upper portion that opens to accept a pipe and a U-shaped space formed by a pair of side walls and a bottom to house the pipe. The housed pipe is clamped so as not to detach from the clamp portion. The main portion has a mounting means for mounting to a fastened member such as a body panel.

There are cases in which vibration develops in pipes due to the pulsating movement of fluids passing through pipes. The transmission of such vibration to the chassis side through the pipe clamp must be avoided. Furthermore, vibration on the chassis side must not be transmitted to the pipes through the pipe clamp. Consequently, pipe clamps have been developed that envelop pipes in soft plastic material. Such pipe clamps do not allow the pipe to make direct contact with the pipe clamp member made of hard plastic and do not directly transmit pipe vibration to the chassis side.

Patent Literature 1 discloses a mounting clip for a wiring harness comprising an elastic clamp and an elastic retainer member formed from a thermoplastic elastomer composition and a hard frame formed from hard thermoplastic resin. The thermoplastic elastomer composition comprises a polyolefin thermoplastic crosslinked elastomer and a polystyrene-vinyl-polyisoprene triblock copolymer. This thermoplastic elastomer composition has vibration-proof properties exceeding those of natural rubber and can be molded as an integral piece with hard thermoplastic resin through insert molding.

The support portion and the retainer tab portion of the hard frame clamp the elastic clamp and the elastic retainer member from above and below in the mounting clip of Patent Literature 1. The support portion and the retainer tab portion formed from hard resin are connected by a hinge portion. The retainer tab portion rotates about the periphery of the hinge portion. The pipe clamp portion must be opened to place the pipe and the retainer tab portion must be closed. Such operations involve effort and time, which constitute a defect.

Patent Literature 2 discloses a vibration-proof clamp in which a pair of clamp tabs formed from hard resin are connected so as to freely open/close via a thin hinge portion. A vibration-proof portion capable of retaining a pipe-shaped piece that is formed from soft resin is disposed on the surface facing the clamp tab. This vibration-proof clamp has a first and second body tab connected by a hinge portion. In addition, a locking pawl at the tip of the second clamp tab engages the locking edge of the first clamp tab. Patent Literature 2 presents the same problems as those of Patent Literature 1.

Patent Literature 3 discloses a vibration-proof clip comprising a clamp that clamps a rod-shaped article, a mounting member that connects to the clamp for mounting on the panel side, and a vibration absorber that forms the box top nested within the box portion of the mount. The vibration-proof clip of Patent Literature 3 is effective in vibration prevention since a vibration absorber is installed between the clamp that clamps the rod-shape piece and the box portion of the mount. Furthermore, the insertion efficiency is good since the vibration absorber is inserted from the side of the box portion of the mount and a connecting plate of the clamp is inserted from the open port of the vibration absorber. However, since the vibration-proof clip of Patent Literature 3 is mounted solely by insertion from the side, there is a fear of its detaching if the clamp from an attachment unit should shift.

Patent Literature 4 discloses a clamp with a clamp body that has an insertion portion for accepting an elongated piece in insertion form from the side, a hooking portion to the clamp body, and an attachment unit that has a mounting portion of the elongated piece to an installation target piece. The hooking portion and the mounting portion of the attachment unit are composed of hard resin, and a vibration absorption layer made of soft synthetic resin is installed between the hooking portion and the mounting portion of the attachment unit. Vibration is absorbed by the vibration absorption layer in the clamp of Patent Literature 4. The insertion portion of the clamp body is inserted in the hooking portion of the attachment unit and firmly connected. Consequently, detachment of the clamp body and attachment unit is inhibited even if vibrated.

Patent Literature 5 discloses a vibration-proof clamp device comprising a tube clamp member with a clamp portion that clamps individual multiple tubes that is formed from hard synthetic resin to integrally connect the joint portion of each clamp portion, a body fitting member formed from hard synthetic resin to mount tube clamp members to the body, and an elastic connection member installed between the tube clamp member and the body fitting member that elastically connects a tube clamp member with a body fitting member that has a vibration absorption function. The elastic connection member has the function of avoiding direct contact between the tube clamp member and the body fitting member. A release prevention portion is formed between the tube clamp member and the body fitting member. However, the tube clamp member and the body fitting member are not combined so as to eliminate mechanical detachment since the mechanical connection strength of the two is not adequate.

BRIEF SUMMARY OF THE INVENTION

The object of the present invention is to provide a vibration-proof pipe clamp with high vibration-proof function. Another object of the present invention is to provide a vibration-proof pipe clamp that follows the slope and twists of pipe due to external force to reliably clamp pipes. Another object of the present invention is to provide a vibration-proof pipe clamp that inhibits detachment of a pipe clamp member that clamps pipes from the mounting member mounted to a body panel, etc.

In the present invention, the pipe clamp member that clamps pipes, etc., and the mounting member mounted to body panels, etc., constitute members that are separately formed from hard resin. A thick elastic connection member made of soft resin is installed between the pipe clamp member and the mounting member so that they do not make direct contact. Hard resin members readily release from soft resin members. A structure is created so that the pipe clamp member and the mounting portion do not detach. The soft resin member is thicker, and the slope and twists of pipe can be followed.

The first embodiment of the present invention is a vibration-proof pipe clamp for clamping long, narrow articles such as pipes, said clamp provided with a pipe clamp member made of hard resin that has pipe clamp portions for restraining aforementioned long, narrow articles, a mounting member made of hard resin that has a mounting portion for mounting to the fastened member, and an elastic connection member made of soft resin that is packed between the aforementioned pipe clamp member and the aforementioned mounting member, wherein the aforementioned pipe clamp member and the aforementioned mounting member do not make direct contact, and a detachment prevention structure is incorporated to inhibit detachment of the aforementioned pipe clamp member from the aforementioned mounting member.

A vibration-proof pipe clamp with high vibration-proof function can be derived since the aforementioned clamp member and the aforementioned mounting member do not make direct contact. In addition, pipes can be reliably clamped because the pipe clamp member and the mounting member have a detachment prevention structure.

The aforementioned detachment prevention structure incorporates a T-shaped portion comprising a prism portion that extends upward from the upper section of the aforementioned mounting member and a flat plate portion that extends transversely from the upper edge of the aforementioned prism portion, two arm portions extending about the aforementioned flat plate portion of the aforementioned T-shaped portion comprising two pendent portions extending down from the base of the said pipe clamp member and two horizontal portions extending transversely so as to approach two tip portions from the lower edge of the said pendent portion, and said elastic connection member would preferably be packed between said T-shaped portion of said mounting member and said arm portion of said pipe clamp member. By so doing, the mounting member and the pipe clamp member can be clamped so as not to detach.

The separation between the tips of the said horizontal portions of the said two arm portions preferably would be smaller than the transverse length of the said flat plate portions of said T-shaped portion.

The said detachment prevention structure preferably would be installed in the center in the transverse direction of the said vibration-proof pipe clamp. By so doing, twisting and sloping of pipe could be easily followed.

The upper portion of said mounting member has a projection formed, and said elastic connection member preferably would surround the periphery of said projection. Ribs are formed below the aforementioned base of said pipe clamp member, and said elastic connection member preferably would surround the periphery of the said ribs. By so doing, detachment of the mounting member and the pipe clamp member could be further inhibited.

Ridges that are higher would be formed above the aforementioned planar portion of said T-shaped portion of the said mounting member, and the said elastic connection member would preferably surround the periphery of said ridges. By so doing, detachment of the mounting member and the pipe clamp member could be further inhibited.

Release preferably would be facilitated between the said pipe clamp member and the said elastic connection member as well as between the said elastic connection member and the said mounting member. Adhesion should not be made between the said pipe clamp member and the said elastic connection member or between the said elastic connection member and the said mounting portion. By so doing, twisting and sloping of pipe could be easily followed.

At least one elastic clamp tab should be installed in the said pipe clamp portion of the said pipe clamp member to obliquely support the said elongated piece from above.

A vibration-proof pipe clamp with high vibration-proof function can be provided by the present invention. In addition, a vibration-proof pipe clamp that can follow the slope and twists of pipe due to external force to reliably clamp pipes can be provided by the present invention. Furthermore, a vibration-proof pipe clamp that inhibits detachment of the pipe clamp member that clamps pipes from the mounting member mounted to body panels can be provided by the present invention.

BRIEF DESCRIPTION OF THE DRAWINGS

FIG. 2 (a) is a top view of pipe clamp member of FIG. 1, (b) a front view, (c) a bottom view, (d) a right side view.

FIG. 4 (a) is a top view of the mounting member of FIG. 3, (b) a front view, (c) a bottom view, (d) a right side view.

FIG. 5 (a), (b) are enlargements of portion C from FIG. 4(b) of the mounting member of FIG. 3.

FIG. 7 (a) is a front view of the vibration-proof pipe clamp of FIG. 6, (b) is a right side view.

FIG. 8 (a) is a cross-sectional view along line A-A of FIG. 7 (b), (b) is a cross-sectional view along line B-B of FIG. 7 (a).

DETAILED DESCRIPTION OF THE INVENTION

Vibration-proof pipe clamp 1 (FIGS. 6-9) based on an embodiment of the present invention is explained with reference to the diagrams. Vibration-proof pipe clamp 1 is provided with pipe clamp member 10 made of hard resin for clamping pipes, mounting member 30 made of hard resin for mounting to body panel 8, and elastic connection member 50 made of soft resin between the pipe clamp member and the mounting member. First, pipe clamp member 10 is explained with reference to FIGS. 1 and 2. Next, mounting member 30 is explained with reference to FIGS. 3 to 5. Finally, vibration-proof pipe clamp 1 that is completed by inserting elastic connection member 50 between pipe clamp member 10 and mounting member 30 is explained with reference to FIGS. 6 to 9.

Figure 7A:
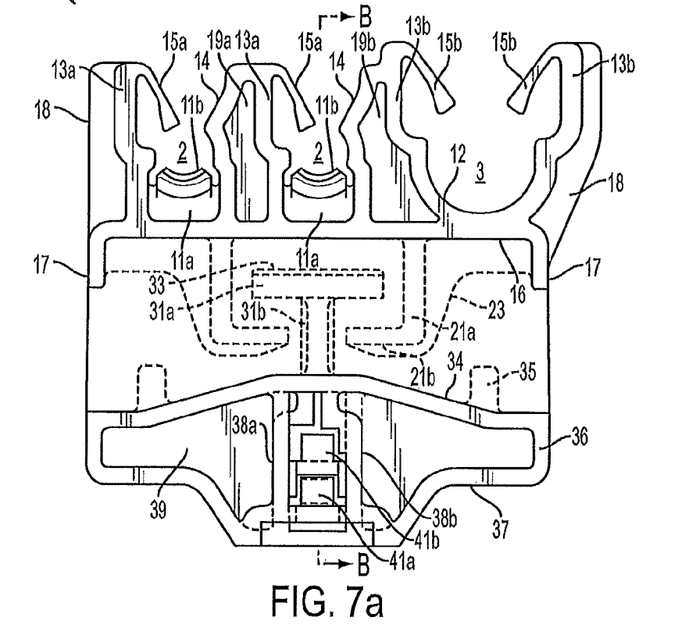

In the explanation of this embodiment of the present invention, FIG. 2 (*b*), FIG. 4 (*b*), FIG. 7 (*a*) are views in the vertical direction. The direction at a right angle to pipes 6, 7 (longitudinal direction of base 16 of pipe clamp member 10, transverse to FIG. 2 (*b*), FIG. 4 (*b*), FIG. 7 (*a*)) is the transverse direction. The direction parallel to pipes 6, 7 (transverse to FIG. 2 (*b*), FIG. 4 (*b*), FIG. 7 (*a*)) is the cross direction.

Figure 1:
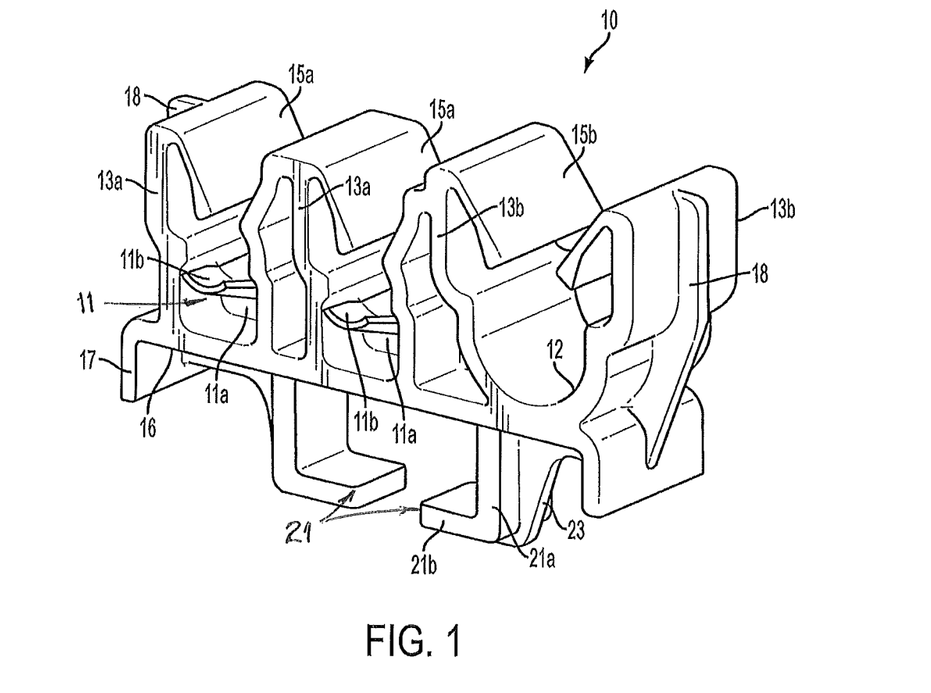
FIG. 1 is an oblique view of the pipe clamp member in one embodiment of the present invention.

FIG. 1 is an oblique view of pipe clamp member 10. FIG. 2 (*a*) is a top view of the pipe clamp member 10 FIG. 1, (*b*) is a front view, (*c*) is a bottom view, and (*d*) is a right side view. Pipe clamp member 10 is formed from hard resin such as polyacetal (POM). Pipe clamp member 10 is provided with virtually rectangular plate-shaped base 16. It has a portion that clamps various pipes such as fuel lines or brake fluid lines above base 16, and a portion for mounting to mounting member 30 below base 16. In this embodiment, pipe clamp member 10 has pipe clamp portion 2 for clamping two narrow pipes above base 16 and one pipe clamp portion 3 for clamping pipes thicker than those for pipe clamp portion 2. Pipe clamp portions 2, 3 are formed in shapes of various sizes so as to clamp various pipes such as fuel lines or brake fluid lines. The number, size or shape of the pipe clamp portions can be arbitrarily selected in conjunction with the pipe (line) that is clamped.

Figure 9:
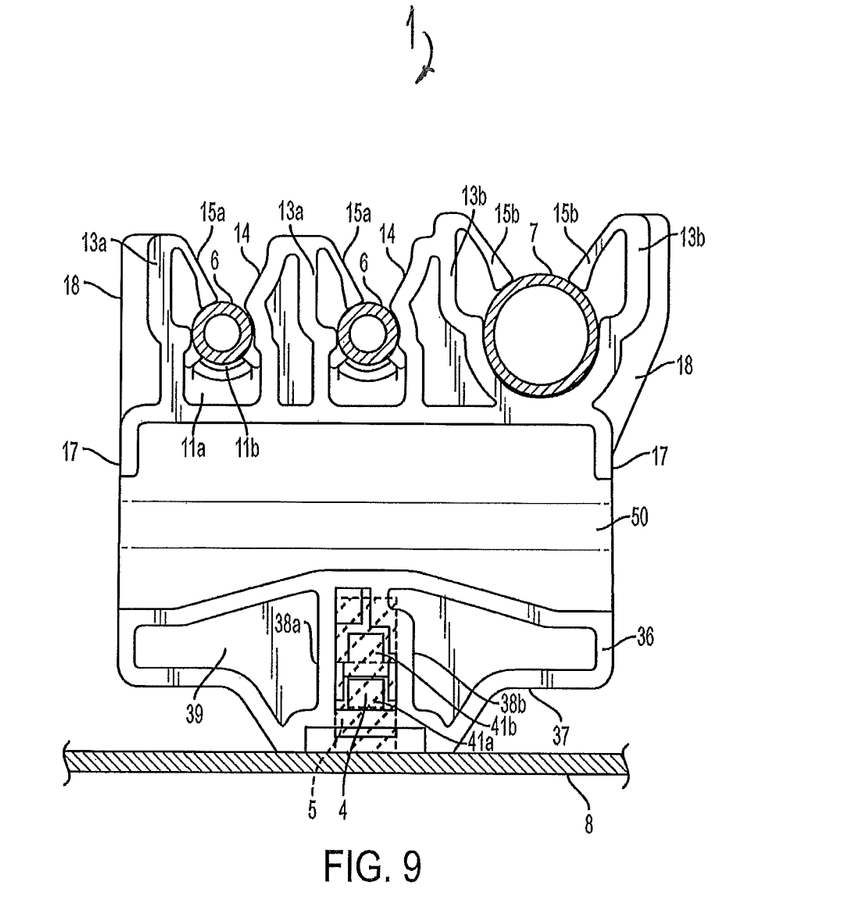
FIG. 9 is a front view showing the mounting portion of a vibration-proof pipe clamp mounted to a stud bolt on the chassis side with a pipe clamped to the pipe clamp portion of the pipe clamp member.

Pipe clamp portions 2 have support portions 11 (FIG. 1) that form the lower portion of the space that houses elongated pieces such as pipes. Support portion 11 is provided with rising portion 11*a* that rises from base 16 and pipe support portion 11*b* that supports the pipe above rising portion 11*a*. Pipe support portion 11*b* is curved at a radius that matches the radius of pipe 6 that is housed (FIG. 9). Pipe support portion 11*b* extends slightly longer than the width of pipe clamp member 10 in the cross direction of pipe clamp member 10 (vertical direction in FIG. 2 (*a*), longitudinal direction of pipe 6). The edges on both sides are bent slightly upward, and pipe 6 that is housed is pushed down. One side of pipe clamp portion 2 (left side of FIG. 2 (*b*)) is vertical wall portion 13*a*. The side of pipe clamp portion 2 extends in virtually the vertical direction. Elastic clamp tab 15*a* extends obliquely in the direction of pipe clamp portion 2.

The other side of pipe clamp portion 2 (FIG. 2 (*b*) right side) forms curved wall portion 14. The lower portion of curved wall portion 14 is curved so as to clamp the side of pipe 6 housed in pipe clamp portion 2 while the upper portion is slanted so as to expand outward. When housing pipe 6 in pipe clamp portion 2, pipe 6, etc., is pushed between elastic clamp tab 15*a* and curved wall portion 14 from above, at which point elastic clamp tab 15*a* flexes and curved wall portion 14 flexes so as to accept pipe 6. Once pipe 6 has been pushed in until it contacts pipe support portion 11*b*, elastic clamp tab 15*a* and curved wall portion 14 revert to their original positions and clamp down on pipe 6 obliquely from above.

Figure 2A:
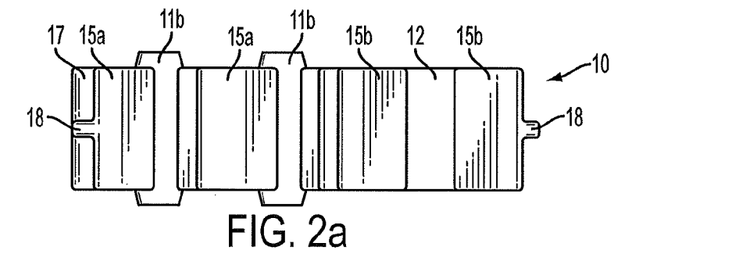
Figure 2B:
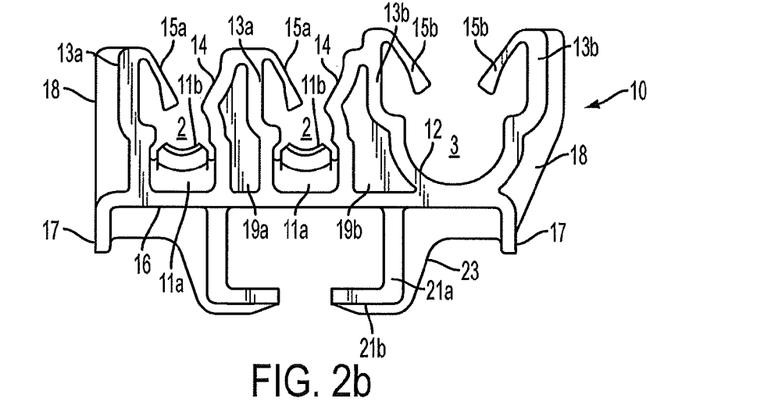
Figure 2C:
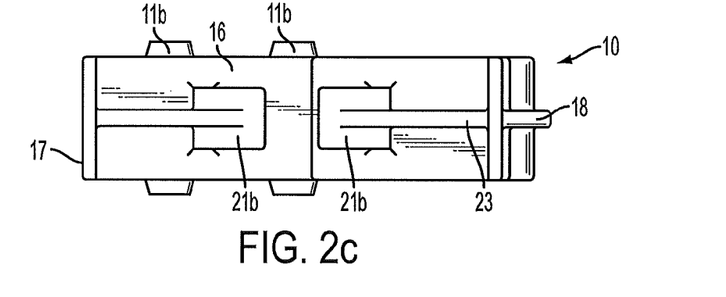
Figure 2D:
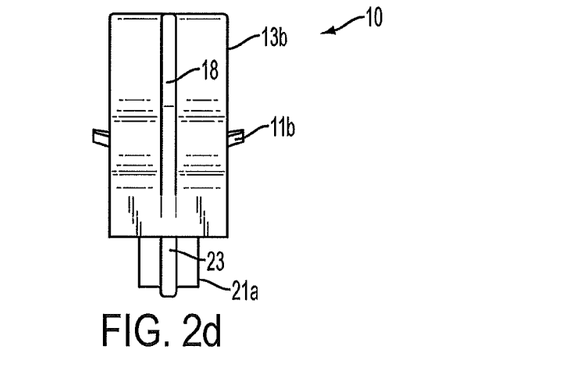

Pipe clamp member 10 has two elastic clamp tabs 15*b* in pipe clamp portion 3 in order to house pipe 7 that is larger than pipe 6 housed in pipe clamp portion 2. Support portion 12 forms the lower portion of pipe clamp portion 3. Support portion 12 differs from support portion 11 in that a rising portion and a pipe support portion are not formed. Support portion 12 is curved on both sides at a radius that matches the radius of pipe 7 that is housed from the lowest position continuous with base 16. Vertical wall portion 13*b* continues from the upper edge on both sides of support portion 12. Vertical wall portion 13*b* extends the sides of pipe clamp portion 3 in virtually the vertical direction. Elastic clamp tab 15*b* extends obliquely in the direction of pipe clamp portion 3 from the tips of both vertical wall portions 13*b* (upper edge of FIG. 2 (*b*)) or nearby.

In housing pipe 7 in pipe clamp portion 3, pipe 7, etc., is pushed from above between two elastic clamp tabs 15*b*, at which point elastic clamp tabs 15*b* expand so as to accept the pipe. Once pipe 7 has been pushed in until it contacts support portion 12, elastic clamp tabs 15*b* revert to their original positions and clamp down on pipe 7 obliquely from above. The number of pipe clamp portions 2 for clamping narrow pipes and of pipe clamp portions 3 for holding thick pipes can be arbitrarily selected as a function of the application.

Support portions 11 and 12, vertical wall portions 13*a* and 13*b*, and curved wall portion 14 are installed above base 16. Both edges of base 16 in the longitudinal direction (left/right directions of FIG. 2 (*b*)) form side portion 17 that curves downward.

Ribs 18 are formed directed upward from side portion 17 in the center in the cross direction (center vertically in FIG. 2 (*a*)) of pipe clamp member 10. Ribs 18 serve to reinforce pipe clamp member 10.

Figure 8A:
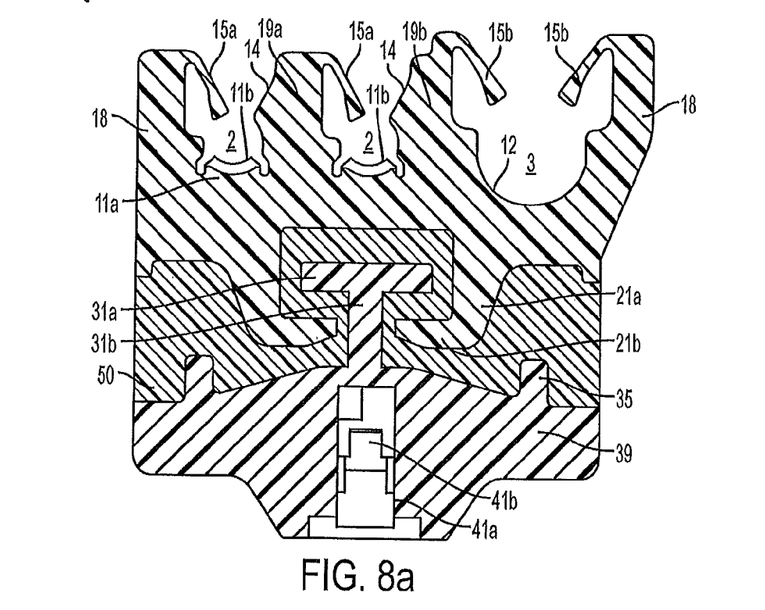
Figure 8B:
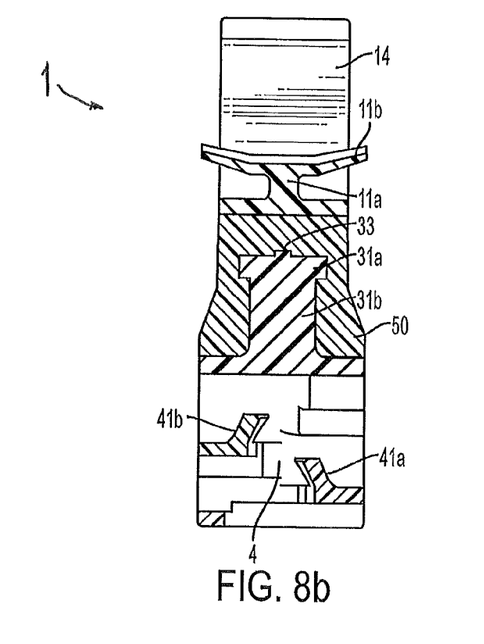

Partition wall 19*a* is installed in a section of two pipe clamp portions 2 between curved wall portion 14 and vertical wall portion 13*a* in the center in the cross direction (center vertically in FIG. 2 (*a*)) of pipe clamp member 10. Partition wall 19*b* is installed in a section between pipe clamp portion 2 and pipe clamp portion 3 on the right (FIG. 8). Partition walls 19*a*, 19*b* are sections that reinforce pipe clamp member 10.

Figure 3:
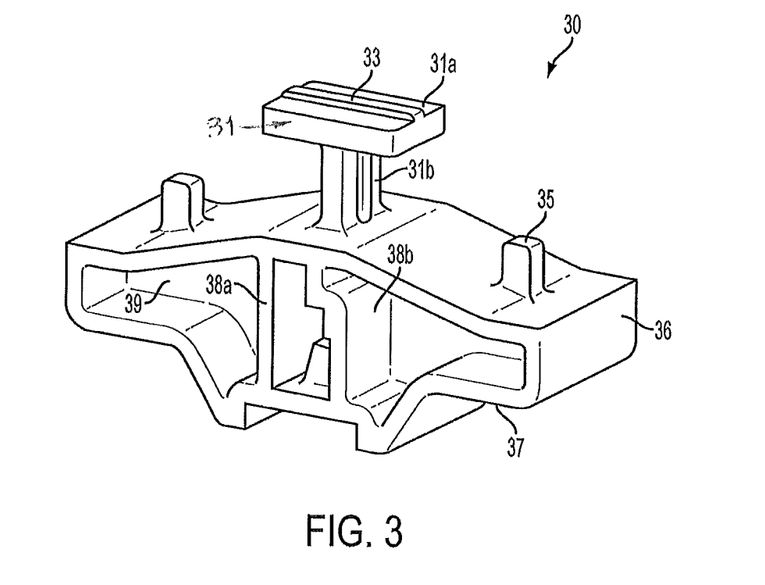
FIG. 3 is an oblique view of the mounting member in one embodiment of the present invention.

Two arm portions 21 (FIG. 1) extend down from positions of uniform intervals to the left/right from the center in FIG. 2 (*b*) from the bottom of base 16. Arm portion 21 has pendent portion 21*a* that extends down from base 16 and horizontal portion 21*b* that extends toward the center from the lower edge of pendent portion 21*a*. The tips of the two horizontal portions 21*b* open a fixed space. Pendent portion 21*a* and horizontal portion 21*b* are formed so as not to detach from T-shaped portion 31 of mounting member 30 (FIG. 3). Ribs 23 are formed under base 16 in the section bounded by side portion 17 and arm portion 21 in the center in the cross direction (center vertically in FIG. 2 (*a*)) of pipe clamp member 10. Ribs 23 serve the purpose of reinforcing pipe clamp member 10.

FIG. 3 is an oblique view of mounting member 30. FIG. 4 (*a*) is a top view of mounting member 30 shown in FIG. 3, (*b*) is a front view, (*c*) is a bottom view, and (*d*) is a right side view. Mounting member 30 is formed from hard resin such as polyacetal (POM). Mounting member 30 has T-shaped portion 31 on top. T-shaped portion 31 comprises flat plate portion 31*a* shaped like a thin parallelepiped, and prism portion 31*b* deployed below flat plate portion 31*a* that connects flat plate portion 31*a* with upper side portion 34. On the upper surface of flat plate portion 31*a* is formed ridge 33 that is higher, extending in the longitudinal direction in the center in the cross direction of mounting member 30. Ridge 33 acts to prevent mounting member 30 from detaching from elastic connection member 50.

As shown in the side view (FIG. 7*a*), flat plate portion 31*a* of T-shaped portion 31 is housed in arm portion 21 of pipe clamp member 10. Prism portion 31*b* of T-shaped portion 31 passes between two horizontal portions 21*b* of arm portions 21 of pipe clamp member 10. A detachment prevention structure that inhibits the detachment of pipe clamp member 10 and mounting member 30 is thus formed.

Figure 6:
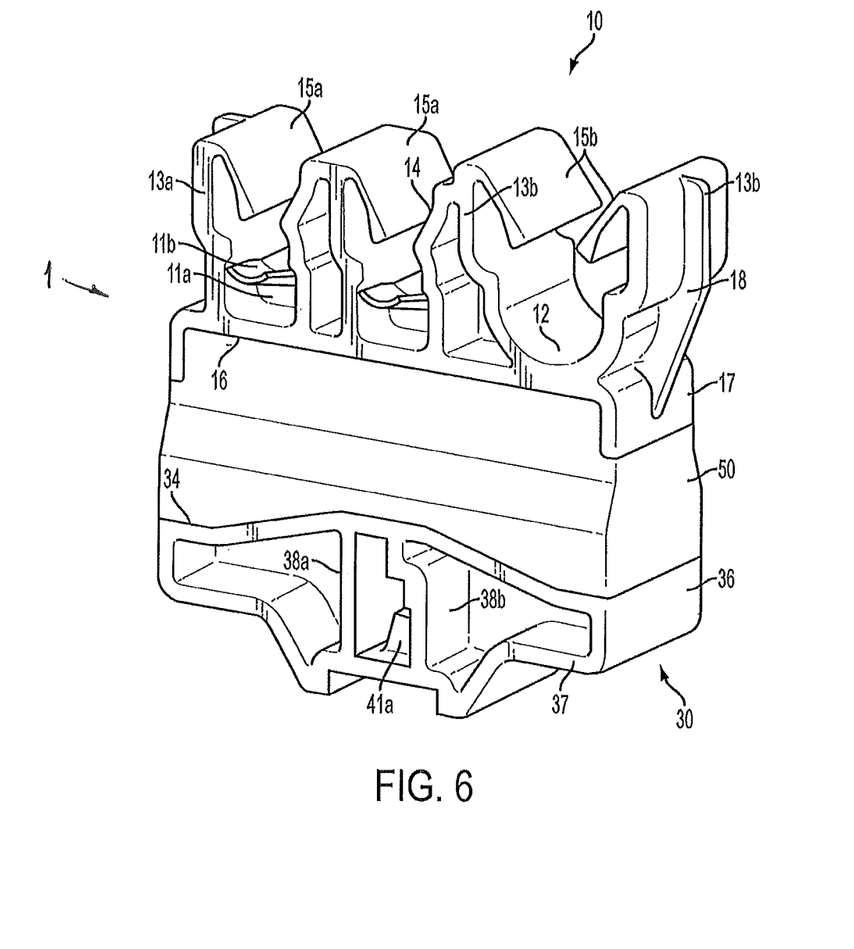
FIG. 6 is an oblique view of the vibration-proof pipe clamp that has elastic connection member formed between the pipe clamp member and the mounting member.

Referring now to FIGS. 6 and 7a, elastic connection member 50 is packed between T-shaped portion 31 of mounting member 30 and arm portion 21 of pipe clamp member 10. That elevates the vibration absorption effect. T-shaped portion 31 is formed in mounting member 30 in this embodiment, and arm portion 21 is formed in pipe clamp member 10. Conversely, arm portion 21 can be formed in mounting member 30 and T-shaped portion 31 can be formed in pipe clamp member 10 as well.

Mounting member 30 shown in the front view of FIG. 4 (b) has upper side portion 34. T-shaped portion 31 slants so as to gradually become lower from the center, where it is highest, toward the outside in the cross direction. By adopting such a shape, the separation between base 16 of pipe clamp member 10 and upper side portion 34 of mounting member 30 increases toward the outside in the cross direction of vibration-proof pipe clamp 1. Elastic connection member 50 that is packed in the portion on the outside in the transverse direction becomes thicker, and mutual tilting of pipe clamp member 10 and mounting member 30 becomes easier to follow. The slope of upper side portion 34 of mounting member 30 is not restricted to the shape shown in the diagrams. Various shapes may be adopted depending on the design conditions. Upper side portion 34 may even been free from any slope.

Figure 4A:
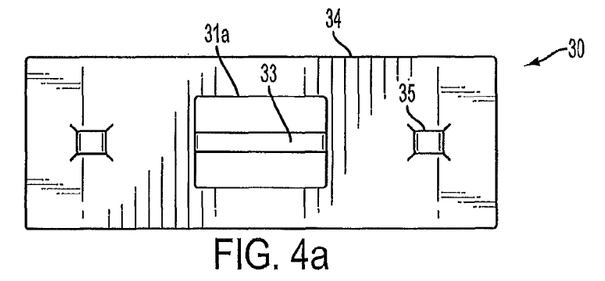
Figure 4B:
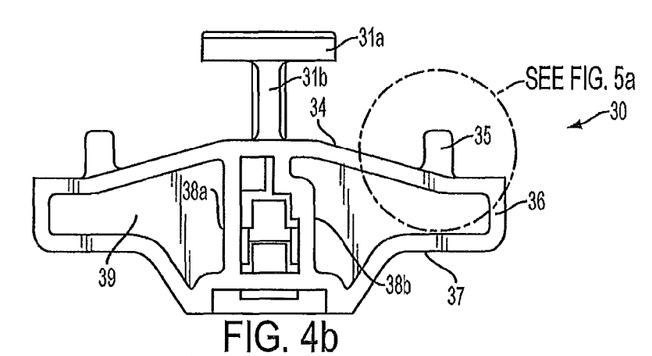
Figure 4C:
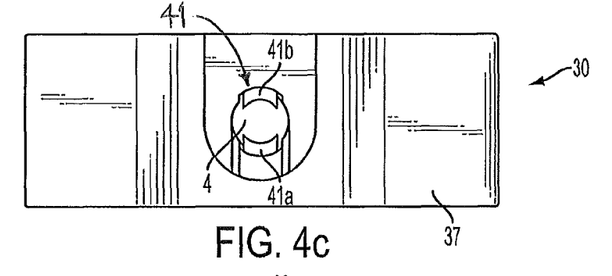
Figure 4D:
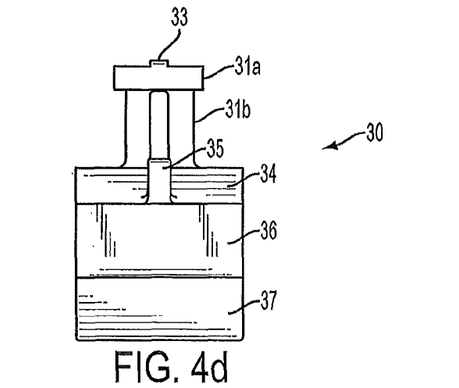
Figure 5A:
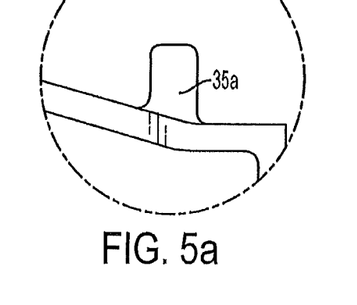
Figure 5B:
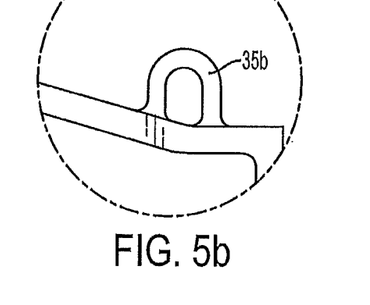

Projections 35 are formed near the tips on both sides of upper side portion 34. The two projections 35 act to inhibit detachment of mounting member 30 from elastic connection member 50. FIG. 5 is an enlargement of the circle denoted by C in FIG. 4 (b). As shown in FIG. 5 (a), projections 35 have a quadrangular prismatic shape. As shown in FIG. 5 (b), the top of projection 35 may be rounded, and holes may be formed in the center. The formation of holes in this manner fortifies the action of inhibiting the detachment of mounting member 30 from elastic connection member 50.

As shown in FIG. 3, mounting member 30 has side portion 36 extending downward from both edges of upper side portion 34. Furthermore, lower side portion 37 having two edges extends toward the center from the lower edge of side portion 36. The portion of lower side portion 37 near the outside extends horizontally, and slopes so that the portion near the center would become lower toward the center. The portion near the outside of lower side portion 37 opens a separation from body panel 8 so that vibration is not transmitted because of the lack of contact with body panel 8. Thus respective side portions 36 join respective edges of upper side portion 34 and lower side portion 37.

Central walls 38a, 38b that link upper side portion 34 with lower side portion 37 are installed near the center with a separation formed. Partition 39 is installed in the center in the cross direction (center vertically in FIG. 4 (a)) of mounting member 30 in the portion enclosed by upper side portion 34, side portion 36, lower side portion 37, and central walls 38a (or 38b) (FIG. 8). Partition 39 acts as a reinforcement.

Stud lock portion 4 is installed in the center of mounting member 30 to lock mounting member 30 to stud bolt 5 mounted on the chassis side. Stud lock portion 4 has a locking pawl 41 for locking to the thread crest of stud bolt 5. Locking pawl 41 comprises locking pawl 41a and locking pawl 41b of different heights that are set at diagonal directions so as to lock stud bolt 5 from both sides. The means of mounting member 30 to the chassis side is not restricted to locking to stud bolt 5 via locking pawl 41. Mounting member 30 may be mounted to the chassis side by other known means such as anchor clips.

Figure 7B:
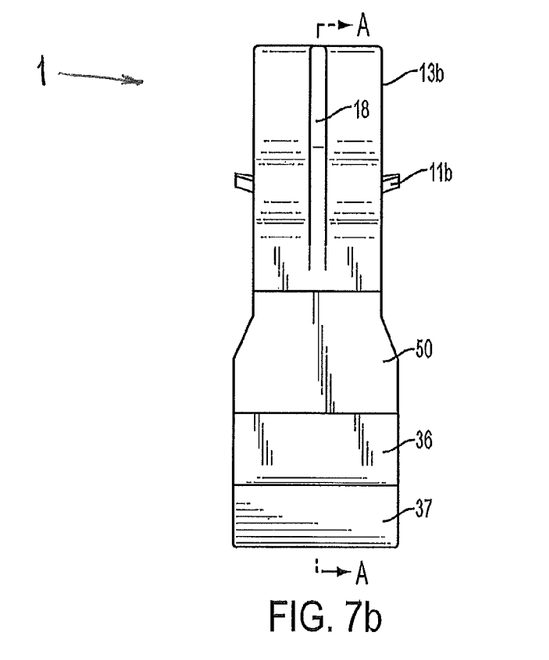

FIG. 6 is an oblique view of vibration-proof pipe clamp 1 in which elastic connection member 50 is formed between pipe clamp member 10 and mounting member 30. FIG. 7 (a) is a front view of the vibration-proof pipe clamp 1 shown in FIG. 6 and (b) is a right side view. FIG. 8 (a) is a cross-sectional view alone line A-A of FIGS. 7 (b) and (b) is a cross-sectional view along line B-B of FIG. 7 (a). Elastic connection member 50 is formed from thermoplastic elastomer (TPE) as the soft resin with vibration-proof function.

Elastic connection member 50 can be formed between pipe clamp member 10 and mounting member 30 by techniques such as insert molding. For example, pipe clamp member 10 and mounting member 30 can be clamped in a predetermined spatial relation and then inserted into a die that holds pipe clamp member 10 and mounting member 30. In one preferred embodiment, the predetermined spatial relation is illustrated in FIGS. 6 and 7a. The pipe clamp member 10 and the mounting member 30 are oriented relative to one another so that side portions 17,17 of the pipe clamp member are generally coplanar with respective side portions 36,36 of the mounting member, and so that a space is defined between the bottom of the pipe clamp member and the upper side portion 34 of the mounting member, and between respective coplanar side portions 17,17 and 36,36. Soft resin material suitable for vibration proofing can be melted, injected in the die, and the soft resin material that had melted in the die could then be solidified. The soft resin material could be solidified in the space between the bottom of base 16 of pipe clamp member 10 and the upper side portion 34 of mounting member 30, and between respective coplanar side portions 17,17 and 36,36 to complete elastic connection member 50.

Soft resin material is inserted in the space between arm portion 21 of pipe clamp member 10 and T-shaped portion 31 of mounting member 30 so that pipe clamp member 10 and mounting member 30 would not detach, as shown in the cross-sectional view of FIG. 8 (a). The transverse length of flat plate portion 31a of T-shaped portion 31 of mounting member 30 is longer than the separation of the tips of horizontal portion 21b of arm portion 21 of pipe clamp member 10 so that detachment of pipe clamp member 10 from mounting member 30 would be inhibited even if the two members should try to separate in the vertical direction.

Furthermore, soft resin material is collected about the periphery of ridge 33 of mounting member 30, the periphery of projections 35, and the periphery of ribs 23 of pipe clamp member 10 to inhibit detachment of pipe clamp member 10 from mounting member 30.

Pipe clamp member 10 and mounting member 30 are formed from hard resin such as polyacetal (POM). Pipe clamp member 10 and mounting member 30 do not make direct contact and are structured so as not to directly transmit vibration. Elastic connection member 50 between pipe clamp member 10 and mounting member 30 is formed from soft resin such as thermoplastic elastomer (TPE). The hard resin and soft resin are not mutually adherent or they are resistant to mutual adherence. Furthermore, they are molded by insert molding, a molding technique that is resistant to adherence. For that reason, pipe clamp member 10 and elastic connection member 50 or mounting member 30 and elastic connection member 50 do not mutually adhere. Furthermore, they readily release if a load such as bending is applied. Thus, they can follow the slope and twists of pipes 6,7 due to vibration. That further enhances their vibration-proof effects.

Release is facilitated between pipe clamp member 10 and elastic connection member 50 and between mounting member 30 and elastic connection member 50 in this manner, but since the shape inhibits detachment between arm portion 21 of pipe clamp member 10 and T-shaped portion 31 of mounting member 30, pipe clamp member 10 and mounting member 30 do not detach.

FIG. 9 is a front view showing the clamping state of pipes 6, 7 in pipe clamp portions 2, 3 of pipe clamp member 10 with mounting member 30 of the vibration-proof pipe clamp of FIG. 6 attached to stud bolt 5 of body panel 8. They are aligned so that stud bolt 5 attached to body panel 8 would come to the position of stud lock portion 4. When stud bolt 5 is pushed onto stud lock portion 4, locking pawls 41a and 41b would lock from both sides of stud bolt 5 to mount vibration-proof pipe clamp 1 on stud bolt 5.

When housing narrow pipe 6 in pipe clamp portion 2, pipe 6 is pushed between elastic clamp tab 15a and curved wall portion 14 from above, at which point elastic clamp tab 15a flexes and curved wall portion 14 flexes so as to accept pipe 6. Once pipe 6 has been pushed in until it contacts pipe support portion 11b, elastic clamp tab 15a and curved wall portion 14 revert to their original positions and clamp down on pipe 6 obliquely from above so as to clamp the pipe in pipe clamp portion 2.

When housing pipe 7 that is larger than pipe 6 in pipe clamp portion 3, pipe 7 is pushed between two elastic clamp tab 15b from above and elastic clamp tabs 15b expand to accept the pipe. Once pipe 7 has been pushed in until it contacts support portion 12, elastic clamp tabs 15b revert to their original positions and push down on pipe 7 obliquely from above so as to clamp the pipe in pipe clamp portion 3.

In the embodiment of the present invention, pipe clamp member 10 and mounting member 30 formed from hard resin do not make direct contact and the transmission of vibration is inhibited since elastic connection member 50 formed from soft resin is inserted between the two. Furthermore, as shown in FIGS. 7a and 9, no part of the T-shaped portion 31 of mounting member 30 is engageable with the body panels or fastening members 8. Also, hard resin and soft resin do not mutually adhere or their adherence is inhibited, as a result of which the hard resin and soft resin will not adhere or they will release, enabling movement of pipes to be followed should any slope or twists of pipe develop due to vibration and the like.

Since a structure that inhibits the detachment of pipe clamp member 10 and mounting member 30 is situated in the center, pipe clamp member 10 and mounting member 30 have a high degree of mutual freedom of movement and do not detach.

Since pipe clamp member 10 and mounting member 30 have a structure resistant to detachment, elastic connection member 50 formed from soft resin that lies between them can be thick. That has the effect of further enhancing the vibration absorption effects. Finally, a broad range of hardness of soft resin can be selected which permits the spring constant to be set over a wide range. Consequently, the development of resonance can be inhibited.

The invention claimed is:

1. A vibration-proof pipe clamp for clamping elongated pieces such as pipes, comprising:
a pipe clamp member made of hard resin and defining a plate-shaped base having two edges,
a pipe clamp portion for locking the elongated pieces being formed on an upper surface of the base,
a side portion formed on, and extending downwardly from, each of the two edges of the base,
two arm portions including two pendent portions formed on a bottom of the base intermediate the side portions, the arm portions extending downwardly from the base, the two arm portions further including two horizontal portions extending transversely from respective lower edges of the pendent portions so that respective tip portions of the horizontal portions approach one another,
a mounting member made of hard resin including a mounting portion for mounting fastened members,
the mounting member further including an upper side portion having two ends and being spaced upwardly by two side portions extending upwardly from respective edges of a lower side portion, the side portions joining respective edges of the upper side portion and the lower side portion,
the pipe clamp member and the mounting member being oriented relative to one another so that respective side portions of the pipe clamp member and the mounting member are generally coplanar, and so that a space is defined between the bottom of the base of the pipe clamp member and the upper side portion of the mounting member,
a detachment prevention structure for inhibiting detachment of the pipe clamp member from the mounting member, wherein the detachment prevention structure having a T-shaped portion including a prism portion that extends upward from the upper side portion of the mounting member so that the prism portion is disposed between respective tip portions of the horizontal portions of the two arm portions, and a flat plate portion that extends transversely from an upper edge of the prism portion so that the two arm portions extend about the flat plate portion, and
an elastic connection member made of soft resin and being packed in the space so that it surrounds the T-shaped portion and the arm portions, and so that it extends between respective coplanar side portions of the pipe clamp member and the mounting member, whereby
the pipe clamp member and the mounting member do not make direct contact.

2. The vibration-proof pipe clamp of claim 1, wherein the separation between the tips of the horizontal portions of the two arm portions is smaller than the transverse length of the flat plate portion of the T-shaped portion.

3. The vibration-proof pipe clamp of claim 1, wherein the detachment prevention structure is installed in the center in the transverse direction of the vibration-proof pipe clamp.

4. The vibration-proof pipe clamp of claim 1, wherein the upper side portion of the mounting member has a projection formed thereon, and the elastic connection member surrounds the periphery of the projection.

5. The vibration-proof pipe clamp of claim 1, wherein a ridge is formed on an upper surface of the flat plate portion of the T-shaped portion of the mounting member, and the elastic connection member surrounds the periphery of the ridge.

6. The vibration-proof pipe clamp of claim 1, wherein release is facilitated between the pipe clamp member and the elastic connection member as well as between the elastic connection member and the mounting member.

7. The vibration-proof pipe clamp of claim 1, wherein adhesion does not take place between the pipe clamp member and the elastic connection member or between the elastic connection member and the mounting member.

8. The vibration-proof pipe clamp of claim 1, wherein at least one elastic clamp tab is installed in the pipe clamp portion of the pipe clamp member to obliquely support the elongated piece from above.

9. A vibration-proof pipe clamp for clamping elongated pieces such as pipes, comprising:
a pipe clamp member made of hard resin including a pipe clamp portion for locking the elongated pieces, a one-piece mounting member made of hard resin including a mounting portion for mounting fastened members, the mounting member further including an upper side portion spaced upwardly by two side portions from a lower side portion, the lower side portion being adjacent the fastened members, and an elastic connection member made of soft resin that is packed between the pipe clamp member and the mounting member, wherein the pipe clamp member and the mounting member do not make direct contact, and further comprising:

a detachment prevention structure for inhibiting detachment of the pipe clamp member from the mounting member, wherein the detachment prevention structure having a T-shaped portion including a prism portion that extends upward from the upper side portion of the mounting member so that no part of the T-shaped portion is engageable with the fastened members, and a flat plate portion that extends transversely from an upper edge of the prism portion, the detachment prevention structure further having two arm portions extending about the flat plate portion of the T-shaped portion, the two arm portions including two pendent portions extending down from a base of the pipe clamp member and two horizontal portions extending transversely from respective lower edges of the pendent portions so that respective tip portions of the horizontal portions approach one another, wherein the elastic connection member is packed between the T-shaped portion of the mounting member and the arm portions of the pipe clamp member, and further comprising:

ribs formed upon, and extend downwardly from, the base of the pipe clamp member, and wherein the elastic connection member surrounds the periphery of the ribs.

\* \* \* \* \*